INVENTOR
Sidney Davis

BY

*Edward H. Loveman*

ATTORNEY

United States Patent Office 3,437,956
Patented Apr. 8, 1969

3,437,956
POSITION INDICATOR
Sidney Davis, East Norwich, N.Y., assignor to Vernitron Corporation, Farmingdale, N.Y., a corporation of New York
Filed June 21, 1967, Ser. No. 647,860
Int. Cl. H03b 5/08, 5/18
U.S. Cl. 331—172          6 Claims

ABSTRACT OF THE DISCLOSURE

A high-gain amplier has its output connected back to its input by a feedback circuit which contains a variable coupling element. The coupling element is comprised of a movable member and a reference member whereby the position of the movable member with respect to the reference determines the amount of coupling. Thus, when the coupling exceeds a critical value, the amplifier breaks into oscillations thereby giving a sharp ON-OFF indication of position.

---

The present invention relates to a position indicator, and more particularly to a rotary position indicator having an electrical output which is sharply ON-OFF depending upon the relative position of a movable element with respect to a reference.

It is often desirable to have available an indicator which indicates the position of an element with respect to a reference, accurately and precisely, and which has an on-off indication, that is which indicates when the element approaches, or is opposite to a reference, with little ambiguity or inaccuracy of position. It is further desirable to provide an indicator which is independent of speed of approach of the movable element with respect to the reference—that is—does not depend upon the rate of change of position of two relatively movable elements for their output, but which merely indicates, staticly, a given position of one element with respect to another.

Briefly, in accordance with the present invention, the electrical indicator is formed of a high gain amplifier having an input and output circuit, inter-connected by a feedback circuit. Inserted in the feedback circuit is a variable coupling element which changes the degree of feedback, that is, the degree of coupling of output to input, in dependence upon the relative position of one element with respect to another. When the coupling exceeds a critical value, the high-gain amplifier in the feedback circuit will break into oscillations, which can readily be detected at the output. It has been found that the point at which the amplifier begins to oscillate is sharply defined; since the circuit either oscillates or not there is no intermediate state of ambiguity possible.

In accordance with a preferred form of the invention, the coupling means are formed as an electro-magnetic transducer having an E-type core, having a primary coil wound on the center leg, secondary coils wound on the outer legs, and facing a toothed movable element, for example, a tooth rotor having teeth spaced so that one tooth is aligned with one outer leg of the E-type core and a space between teeth aligned with the other outer leg. The center leg is preferably double the width of a tooth.

By differentially connecting the secondary coils and connecting the resultant output to the input of the amplifier, while connecting the primary coil to the output of the amplifier, the coupling between input and output of the amplifier can be varied from zero to a maximum, back to zero and to a negative value (with respect to phase). As soon as the coupling from output to input of the amplifier becomes ever so slightly positive, the amplifier breaks into oscillations, giving a reliable indication of the position of the teeth with respect to the E-core. As soon as the teeth have moved so that the coupling zero again, oscillations stop.

A pair of E-type cores may be arranged around the circumference of a rotor offset with respect to each other by 90 electrical degrees. The output can then be fed into a logic circuit. In this way the resolution of the output can be increased 4-fold, that is, change of output can be obtained from the logic circuit upon movement of one-fourth of the distance of the rotor relative to a system having only a single core-toothed element combination.

It is therefore a primary object of this invention to provide a position indicator for measuring the position of a movable element which is independent of the speed of the moving element.

A further object of this invention is to provide a position indicator which has a sharp ON-OFF characteristic.

It is a still further object of this invention to provide a position indicator for measuring the position of a movable element having a high-gain amplifier whose input is coupled to the output by a variable coupling element responsive to the position of the movable element.

These and other objects of this invention and many of the attendant advantages of this invention will be readily appreciated as the same becomes better understood by reference to the following detailed description when considered in connection with the accompanying drawings in which.

Figure 1:
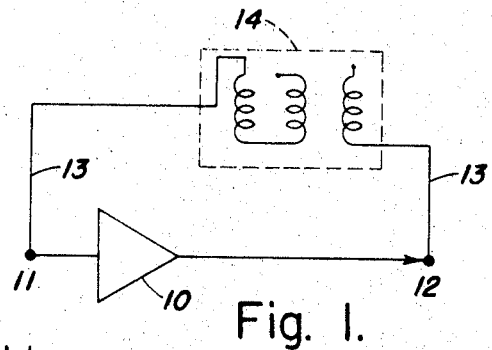
FIG. 1 is a schematic block diagram of the indicator system of the present invention.

Referring now to the drawings wherein like reference characters designate like or corresponding parts throughout the several views there is shown the indicator system according to the present invention which includes a high-gain amplifier 10 having an input 11 and an output 12. Connecting output to input is a feedback circuit 13 which has a coupling element 14 inserted therein for varying the coupling between the output derived from 12 and the input applied at 11. This coupling between output and input can vary from a negative to a positive value, or between zero and positive as desired. The high-gain amplifier will function as an oscillator as soon as sufficient output is fed back to the input to sustain oscillations. The amount of output to be fed back to the input can be very small, i.e. if the polarity of the output is correctly set, oscillations will start to occur just as soon as the feedback signal is increased to a specific critical value, just slightly above zero. Just below this critical value there is not enough signal for oscillations; just above this value there is. Thus, the transition between ON and OFF is very sharp and the output is in binary form. Therefore, the device, apart from being utilized as a position indicator, can function as an encoder.

The variable coupling element 14, inserted in the feedback loop 13 can simultaneously act as a position transducer and as the coupling element. If the coupling changes, for example, as a function of a shaft angle, very sharply defined switching points, having a clear definition of ON and OFF operation of the amplifier will occur.

The output from the amplifier in oscillating condition can be made high enough to drive an appreciable load, since oscillators inherently have a wide current swing. If the design of the time-constant of the system is such that an inherently fairly high frequency of oscillation is achieved, for example, in the order of several megacycles, the response to changing inputs can be very fast, and faster than most similar devices.

Figure 2:
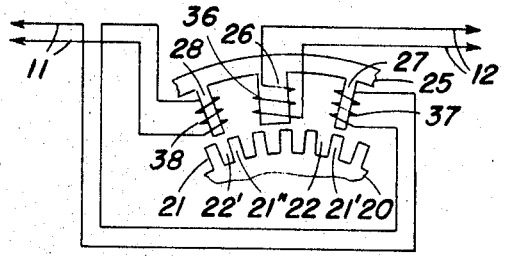
FIG. 2 is an enlarged view of the variable coupling element of FIG. 1.
Figure 2A:
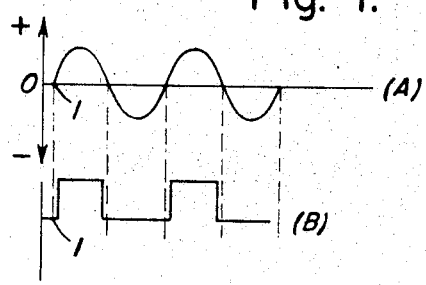
FIGS. 2a and 2b are diagrams indicating the operation of the coupling element.

FIG. 2 illustrates a coupling element 14 formed as a magnetic transducer having a variable reluctance path. Coupling varies from positive to negative with respect to rotation of a shaft connected to a rotor 20 having teeth 21 with intermediate spaces 22. Opposite to the rotor is an E-type core 25, having a center leg 26 wound with a primary coil 36 and connected to output 12 of the amplifier channel. The outer legs 27, 28 are wound with a secondary coil 37 and 38 respectively, each of the secondary coils are connected in opposition so that when the reluctance of the magnetic circuit formed by the outer legs 27, 28 of the E-core 25 and opposed teeth 21 of rotor 20 are equal, the output is zero. Thus, when the rotor has moved to the left from the position shown in FIG. 2, by the width of a half of a tooth, the output at lines 11 will be zero and the coupling from the primary coil 36 to the secondary coils 37, 38 will be zero. This condition is illustrated in diagram A of FIG. 2a, at point 1. As soon as the rotor continues to move from this position, the relative reluctance of the path from a tooth 21' to leg 27, and from another tooth 21" to leg 28 will change. If the change is such that the output is in a positive direction, i.e. the coupling between primary coil 36 and the differentially connected coils 37, 38 changes in a positive direction as shown on diagram A of FIG. 2a at point 1, positive feedback will be introduced and the circuit will begin to oscillate, giving a large sharp on and off characteristic curve as shown in diagram B of FIG. 2a.

Figure 2B:
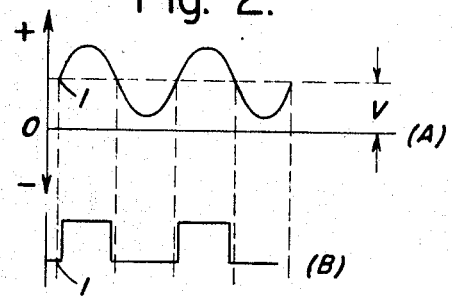

The variable coupling element or transducer shown in FIG. 2, in the connection shown, introduces coupling which varies from positive to negative with respect to position of the rotor 20 relative to the core 25. It is also possible to use a transducer in which the feedback varies periodically between two positive limits; electrically, this situation is shown in FIG. 2b, diagram A. By introducing a fixed negative feedback of the value V, the net feedback will then vary about the axis V as shown in FIG. 2b and the sharp on-off characteristic curve is again obtained as shown in diagram B of FIG. 2b.

The rotor teeth are approximately the same width as the outer legs of the E-type core; the center leg of the E-type core is preferably approximately twice as wide as each of the outer legs. The width of the teeth 21, and the spaces 22 therebetween are again preferably approximately equal. The spacing between the teeth with respect to the core is so chosen that when a tooth, for example tooth 21', is exactly opposite the outer leg, for example outer leg 27 of the core, the other outer leg 28 of the core is opposite a space, for example 22'.

Figure 3:
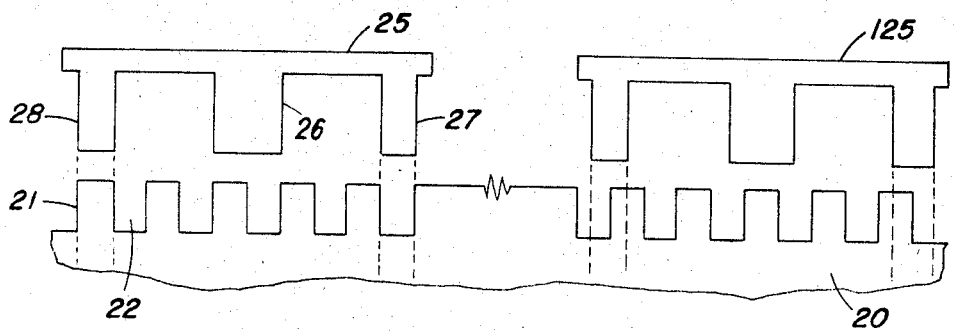
FIG. 3 is a view of another embodiment of the variable coupling element of FIG. 2.

FIG. 3 shows a variable coupling element or motion transducer in which the movable element is rectilinear and which may also be considered as the developed surface of a rotor. A pair of similar cores 25 and 125 are arranged along the movable element. They are off-set with respect to each other by half the width of a tooth as shown in dotted lines, that is, by 90 electrical degrees (with reference to FIG. 2a). Each one of the cores 25, 125 is connected to its own amplifier-feedback circuit (not shown) and each circuit has a separate output 12 and 112. The pair of cores illustrated in FIG. 3 and their respective circuits cooperate with one and the same movable element or rotor 20 and thus may provide an indication of direction of movement as will hereinafter be more fully described. Moreover, by suitable decoding of the output in a logic circuit, the resolution of the device can be increased without increase in the number of teeth of the rotor and consequently increase in the requirement of accuracy of manufacture as will be described below.

Figure 4A:
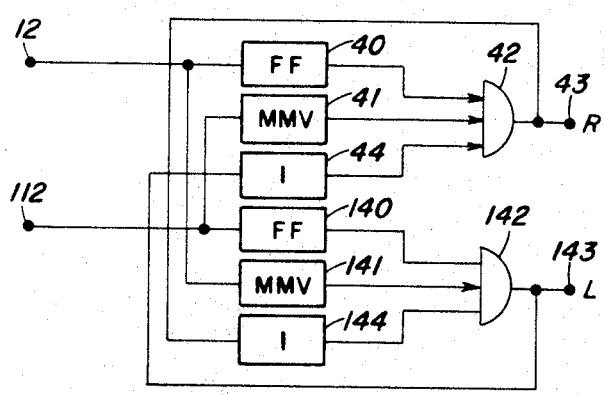
FIGS. 4a, 4b and 4c are schematic diagrams and a truth table of outputs obtained when utilizing the variable coupling element of FIG. 3.

Considering again FIG. 2, when the reluctance of the path from tooth 21' to leg 27 is a minimum, the reluctance of the path from gap 22' to leg 28 is a maximum. At intermediate positions of the movable rotor 20, there will of course, be intermediate values. If, now, a second core 125 is so located that when the reluctance of the path of one leg of core 25 is a maximum, and the reluctance of the path of a leg of core 125 is at an intermediate value, that is, if core 125 is off-set 90 electrical degrees with respect to core 25, the output from core 125 will likewise be shifted 90 electrical degrees with respect to the output from core 25. The result will be a 2-phase output as a function of position, and in the case of the rotor as a function of angular position of the movable element with respect to the cores. This enables determination of direction, because a determination can be made as to which output follows which, i.e. order of reception of signals, by use of simple logic circuitry. An example of such logic circuitry, which gives an indication of direction, is shown in FIG. 4a where the output from an amplifier-feedback circuit coupled to a first core of FIG. 3 is applied at 12 and the output from a second amplifier-feedback circuit coupled to a second core of FIG. 3 is applied at 112. The signals at 12 and 112 are connected to respective flip-flop circuits 40 and 140, and likewise to a respective monostable or one-shot multivibrator 141 and 41. Outputs from the flip-flops 40 and 140 are coupled with the outputs respectively of monostable multivibrator 41, 141 in respective AND-gates 42 and 142 which have respective outputs 43, 143. Re-set circuits for the flip-flops can be provided as is well known in the art. The outputs 43 and 143 are connected via inverters 144 and 44 back to the respective inputs of the AND-gates 142 and 42.

If there is an output at terminal 12, it will set flip-flop 40 and briefly cause a pulse at AND-gate 142 by monostable multivibrator 141. A following pulse at terminal 112 will cause a pulse applied over multivibrator 41 to be applied to AND-gate 42, which is enabled inasmuch as there is no output from terminal 143, and thus the inverter 44 is enabled. There will be an output at 43, indicating for example movement towards the right. Simultaneously, because of the output at 43, the inverter 144 is disabled thereby disabling the AND-gate 142. Upon a first occurrence of a pulse on terminal 112 the situation will be reserved.

Figure 4C:
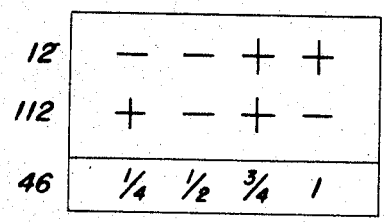
Figure 4B:
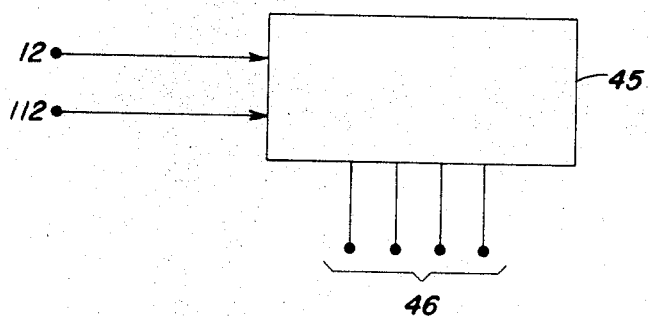

Entirely apart from giving an indication of direction of approach, for example from the right (terminal 43-R) or from the left (terminal 143-L) the resolution is also vastly improved. Referring to FIG. 4b, the outputs 12 and 112 may be applied to a decoding network 45, the truth table for which is indicated in FIG. 4c, with the lines corresponding to the outputs 12 and 112 being similarly indicated and the output obtained from decoding Matrix 45 being shown at 46. It can be seen that by suitably decoding the binary output from line 12 and the 90 degrees phase shifted binary output from line 112, the conditions of the two indicator circuits comprising cores 25, 125 arising within one cycle, that is motion of one tooth and one space before any one leg, can be decoded and split into four conditions. Thus, the resolution of the circuit is improved by a factor of four without in any way increasing the number of teeth on the rotor, or movable element 20. In the truth table in FIG. 4c, the polarity plus and minus signs indicate ON and OFF conditions respectively.

As an illustrative example, a rotor of about 4 cm. in diameter may have 64 teeth, each about 1 mm. wide; and the outer legs of the E pickoff may be about 0.8 mm. wide and the center leg being 1.6 mm.

Although the coupling of the feedback from output 12 to input 11 in circuit 13 as heretofore described has been achieved by changing the magnetic reluctance of a magnetic path, other embodiments are, of course, possible. For example, an E-type transformer may be used in a very high frequency circuit, with a rotor comprised of a rotating notched copper disk to turn the output ON and OFF. For very high frequencies, oscillator coils can be printed on the face of a flat disk, with an opposed disk having printed conductors on its face, to vary the coupling so that the oscillator is turned ON or OFF. Capacitive coupling may also be used, with the variation in the capacity between input and output being governed by position of one element with respect to another. Also, the coupling may be a resistance coupling network, with the resistance in the feedback circuit being varied in dependence on the position of two elements. Such a resistance may be a resistor unit, or the discharge path of a tube or the internal path of a semi-conductor element.

Figure 5:
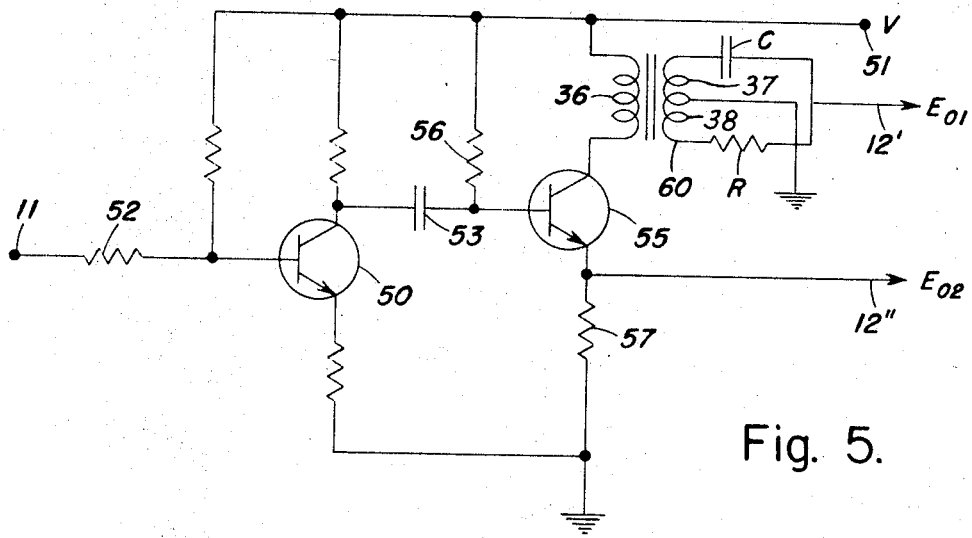
FIG. 5 is a detailed circuit diagram of an amplifier-transducer combination useful in the system of FIG. 1.

A circuit which combines an amplifier and a feedback circuit directly is illustrated in FIG. 5. A transistor 50 is supplied from a source 51, and has its base connected over a coupling resistor 52 to the amplifier terminal 11. The amplifier output is applied over a condenser 53 to a second transistor 55. Transistor 55 is biased by resistors 56, 57 as is well known in the art. Included in the collector circuit of transistor 55 is the primary coil 36 of the E-core 25. An additional secondary coil 60, which may be center-tapped, can function directly as the coils 37, 38 wound on the outer legs of the E-type core and cooperates with the toothed element 20, so that one compact structure is obtained. The conventional use of an R-C network coupled to the secondary coil 60 determines the particular frequency of oscillation. Thus in operation when the rotor 20 of FIG. 2 moves from position 1 (FIG. 2a), positive feedback will be transmitted via 12′ to the input 11 and the circuit will begin to oscillate thereby giving a sharp ON indication of position. When the rotor 20 has moved to the position shown in FIG. 2, the output from coils 37 and 38 in FIG. 5 are equal and opposite and the output from 12′ will be zero whereby the circuit oscillation will cease giving a sharp OFF indication. The output from terminal 12″ may control other equipment, such as an indicator (not shown) or be connected to the decoding circuit 45 of FIG. 4b or the logic circuit of FIG. 4a as described below.

Output 12′ introduces positive feedback when connected back to terminal 11 (FIG. 1) whereas the output 12″ will introduce negative feedback if connected to terminal 11. Thus a small amount of negative feedback from output 12′ may be used to stabilize the circuit, although temperature changes and variations and transistor characteristics do not essentially alter circuit behavior, even without such stabilization. In an illustrative example, the transistors were of the type 2N3904, the RC network consisted of a condenser of 5,000 pfd. and 1,600 ohms, resistance 52 was 50,000 ohms, resistance 57, 500 ohms and resistance 56 adjusted for a collector current through transistor 55 of 4 ma. with terminal 11 grounded.

The present invention thus provides an electrical position indicator which switches between a pair of states ON and OFF in dependence on the coupling from output to input in a feedback circuit of an amplifier; it is particularly adapted to magnetic encoders, limit switches, and other position sensitive devices. By varying the coupling of the feedback circuit of a high-gain amplifier, a sharp binary ON-OFF output can be obtained even though the change of reluctance, or output from a transducer would be sinusoidal.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. An electrical position indicator comprising,
   a first high gain amplifier having an input and an output,
   a feedback circuit interconnecting said input and said output, said feedback circuit having a coupling means for varying the feedback from a value below critical corresponding to a quiescent state of said amplifier to a value above critical corresponding to an oscillating state of said amplifier, said coupling means comprising,
   a first E-type core having a primary coil coupled to said output of said amplifier and wound on the center leg of said core and a pair of secondary coils oppositely wound on each of the outer legs of said core and coupled to said input of said amplifier, and
   a multi-toothed element movable with respect to said E-type core and positioned to face the legs of said core, the teeth on said element being spaced so that only one tooth at a time will be in matching opposite position with respect to any one outer leg of said core whereby the position of said element with respect to said core determines the state of said amplifier.

2. The indicator as recited in claim 1 wherein each of the outer legs of said core is approximately the same width as each of the teeth in said element and said center leg is twice the width of one of said outer legs.

3. The indicator as recited in claim 1 wherein said element is circular and forms a rotor and said core is arcuately shaped whereby the ends of each of said legs facing said element are equally distant from the teeth of said rotor.

4. The indicator as recited in claim 1 further including,
   a second high gain amplifier identical to said first amplifier, and
   a second E-type core having legs and coils thereon identically to said legs and coils on said first core, the coils on said second core being coupled to said second amplifier identically as said coils on said first core are coupled to said first amplifier, said second core being positioned along said element such that the legs on said second core are offset one-half the width of a tooth of said element with respect to the alignment of the legs on said first core with the teeth of said element, whereby the output of said E-type cores will be sequential.

5. The indicator as recited in claim 4 further including logic circuit means coupled to the output of said first and second amplifiers and responsive to the order of reception of signals therefrom to indicate the direction of movement of said element.

6. The indicator as recited in claim 4 further including decoding means responsive to the simultaneous polarity of signals from said first and second amplifiers to decode and resolve said signals to indicate one of four conditions.

References Cited

UNITED STATES PATENTS

| | | | |
|---|---|---|---|
| 2,630,529 | 3/1953 | Mann et al. | 331—181 |
| 2,918,666 | 12/1959 | Brower et al. | 331—181 |
| 2,985,848 | 5/1961 | Raffaelli | 331—181 |
| 3,176,241 | 3/1965 | Hogan et al. | 331—172 |

JOHN KOMINSKI, *Primary Examiner.*

U.S. Cl. X.R.

307—218; 331—65, 108, 181; 336—30, 133, 134